(12) United States Patent
Barnes et al.

(10) Patent No.: US 8,303,705 B2
(45) Date of Patent: Nov. 6, 2012

(54) CYANOACRYLATE COMPOSITIONS

(75) Inventors: Rory B. Barnes, Dublin (IE); Barry N. Burns, Killiney (IE); Rachel M. Hersee, Dublin (IE)

(73) Assignee: Henkel Ireland Ltd., Dublin (IE)

( * ) Notice: Subject to any disclaimer, the term of this patent is extended or adjusted under 35 U.S.C. 154(b) by 0 days.

(21) Appl. No.: 13/270,263

(22) Filed: Oct. 11, 2011

(65) Prior Publication Data

US 2012/0085492 A1   Apr. 12, 2012

Related U.S. Application Data

(63) Continuation of application No. PCT/EP2010/055931, filed on Apr. 30, 2010.

(60) Provisional application No. 61/174,715, filed on May 1, 2009.

(51) Int. Cl.
   *C09J 4/04* (2006.01)
   *C08K 5/3477* (2006.01)
   *B32B 37/12* (2006.01)

(52) U.S. Cl. .................. 106/287.2; 156/331.6; 524/101

(58) Field of Classification Search ............... 156/331.6; 106/287.2; 524/101
   See application file for complete search history.

(56) References Cited

U.S. PATENT DOCUMENTS

| | | | |
|---|---|---|---|
| 3,988,299 A | 10/1976 | Malofsky | |
| 4,196,271 A * | 4/1980 | Yamada et al. | 525/242 |
| 4,556,700 A | 12/1985 | Harris et al. | |
| 4,622,414 A | 11/1986 | McKervey | |
| 4,636,539 A | 1/1987 | Harris et al. | |
| 4,695,615 A | 9/1987 | Leonard et al. | |
| 4,718,966 A | 1/1988 | Harris et al. | |
| 4,837,260 A | 6/1989 | Sato et al. | |
| 4,855,461 A | 8/1989 | Harris | |
| 4,906,317 A | 3/1990 | Liu | |
| 5,288,794 A | 2/1994 | Attarwala | |
| 5,306,752 A | 4/1994 | Attarwala | |
| 5,312,864 A | 5/1994 | Wenz et al. | |
| 5,328,944 A | 7/1994 | Attarwala et al. | |
| 5,424,343 A | 6/1995 | Attarwala | |
| 5,424,344 A | 6/1995 | Lewin | |
| 5,530,037 A | 6/1996 | McDonnell et al. | |
| 6,093,780 A | 7/2000 | Attarwala | |
| 6,607,632 B1 | 8/2003 | McDonnell et al. | |
| 6,835,789 B1 | 12/2004 | Kneafsey et al. | |
| 2006/0094833 A1 | 5/2006 | McDonnell et al. | |

OTHER PUBLICATIONS

H.V. Coover, D.W. Dreifus and J.T. O'Connor, "Cyanoacrylate Adhesives" in *Handbook of Adhesives*, 27, 463-77, 3rd ed. (1990).
G.H. Millet, "Cyanoacrylate Adhesives" in *Structural Adhesives: Chemistry and Technology*, p. 249-307 (1986).
International Search Report for International Patent Application No. PCT/EP2010/055931 mailed Aug. 4, 2010.

* cited by examiner

*Primary Examiner* — Satya Sastri
(74) *Attorney, Agent, or Firm* — Steven C. Bauman

(57) ABSTRACT

This invention relates to cyanoacrylate compositions that include, in addition to the cyanoacrylate component, a compound embraced by structure A:

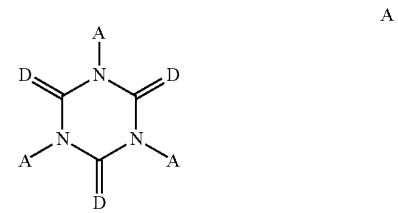

where D is independently a member selected from O or S, and A is independently a member selected from hydrogen, linear, branched or cyclic alkyl groups having from 1 to about 20 carbon atoms, alkenyl groups having from 2 to about 20 carbon atoms, alkynyl groups having from 2 to about 20 carbon atoms, and aryl groups having from 6 to about 20 carbon atoms, with or without interruption or substitution by a member selected from halogen, silicon, hydroxy, ester, and sulfate, provided that at least one A is not H and that at least one A has at least one carboxyl group attached thereto.

14 Claims, No Drawings

CYANOACRYLATE COMPOSITIONS

BACKGROUND OF THE INVENTION

1. Field of the Invention

This invention relates to cyanoacrylate compositions that include, in addition to a cyanoacrylate component, a compound embraced by structure A:

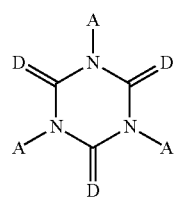

where D is independently a member selected from O or S, and

A is independently a member selected from hydrogen, linear, branched or cyclic alkyl groups having from 1 to about 20 carbon atoms, alkenyl groups having from 2 to about 20 carbon atoms, alkynyl groups having from 2 to about 20 carbon atoms, and aryl groups having from 6 to about 20 carbon atoms, with or without interruption or substitution by a member selected from halogen, silicon, hydroxy, ester, and sulfate, provided that at least one A is not H and that at least one A has at least one carboxyl group attached thereto.

2. Brief Description of Related Technology

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in *Handbook of Adhesives*, 27, 463-77, I. Skeist, ed., Van Nostrand Reinhold, New York, 3rd ed. (1990). See also G. H. Millet, "Cyanoacrylate Adhesives" in *Structural Adhesives: Chemistry and Technology*, S. R. Hartshorn, ed., Plenun Press, New York, p. 249-307 (1986).

However, some substrates to be adhesively bonded are routinely acknowledged as having less than desirable performance with cyanoacrylate compositions as the adhesive material. One of those substrates is aluminum.

Thus, it would be desirable to provide cyanoacrylate compositions that demonstrate desirable performance on difficult-to-bond substrates, such as aluminum.

SUMMARY OF THE INVENTION

The present invention is directed to a cyanoacrylate composition, which includes beyond a cyanoacrylate component, a compound embraced by structure A:

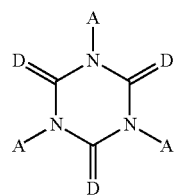

where D is independently a member selected from O or S, and
A is independently a member selected from hydrogen, linear, branched or cyclic alkyl groups having from 1 to about 20 carbon atoms, alkenyl groups having from 2 to about 20 carbon atoms, alkynyl groups having from 2 to about 20 carbon atoms, and aryl groups having from 6 to about 20 carbon atoms, with or without interruption or substitution by a member selected from halogen, silicon, hydroxy, ester, and sulfate, provided that at least one A is not H and that at least one A has at least one carboxyl group attached thereto.

This invention is also directed to a method of preparing the inventive compositions. Also, the invention is directed to a method of bonding together two substrates, which method includes applying to at least one of the substrates a composition as described above, and thereafter mating together the substrates. In one aspect, at least one of the substrates should be constructed of aluminum.

In addition, the present invention is directed to reaction products of the inventive compositions.

The invention will be more fully understood by a reading of the section entitled "Detailed Description of the Invention", which follows.

DETAILED DESCRIPTION OF THE INVENTION

As noted above, this invention is directed to a cyanoacrylate composition, which includes beyond a cyanoacrylate component, a compound embraced by structure A:

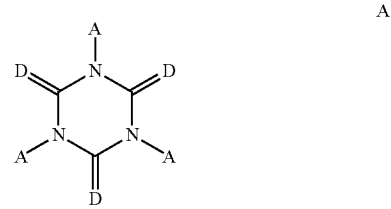

where D is independently a member selected from O or S, and

A is independently a member selected from hydrogen, linear, branched or cyclic alkyl groups having from 1 to about 20 carbon atoms, alkenyl groups having from 2 to about 20 carbon atoms, alkynyl groups having from 2 to about 20 carbon atoms, and aryl groups having from 6 to about 20 carbon atoms, with or without interruption or substitution by a member selected from halogen, silicon, hydroxy, ester, and sulfate, provided that at least one A is not H and that at least one A has at least one carboxyl group attached thereto.

The cyanoacrylate component includes cyanoacrylate monomers which may be chosen with a raft of substituents, such as those represented by $H_2C=C(CN)-COOR$, where R is selected from $C_{1-15}$ alkyl, alkoxyalkyl, cycloalkyl, alkenyl, aralkyl, aryl, allyl and haloalkyl groups. Desirably, the cyanoacrylate monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable one is ethyl-2-cyanoacrylate.

The cyanoacrylate component should be included in the compositions in an amount within the range of from about 50% to about 99% by weight, with the range of about 75% to about 98% by weight being desirable, and about 85 to about 95% by weight of the total composition being particularly desirable.

The compound embraced by structure A may include a variety of possible materials. Particularly desirable compounds include those where D is O. In addition, particularly desirable compounds include those where at least one A is a methyl, ethyl or propyl carboxylic acid, such as where each A is ethylene carboxylic acid.

The compound embraced by structure A should be present in a concentration of about 0.0001% to about 10% by weight, such as about 0.0003% to about 3% by weight, with about 0.05% to about 1% being particularly desirable.

Accelerators may also be included in the inventive rubber toughened cyanoacrylate compositions, such as any one or more selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

For instance, as regards calixarenes, those within the following structure are useful herein:

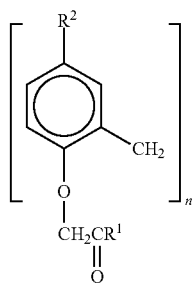

where here $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, examples which may be used herein either individually or in combination include 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Of the silacrowns, again many are known, and are reported in the literature. For instance, a typical silacrown may be represented within the following structure:

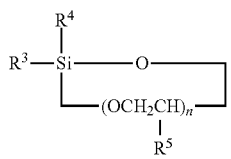

where here $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups, such as methoxy, and aryloxy groups, such as phenoxy. The $R^3$ and $R^4$ groups may contain halogen or other substituents, an example being trifluoropropyl. However, groups not suitable as $R^4$ and $R^5$ groups are basic groups, such as amino, substituted amino and alkylamino.

Specific examples of silacrown compounds useful in the inventive compositions include:

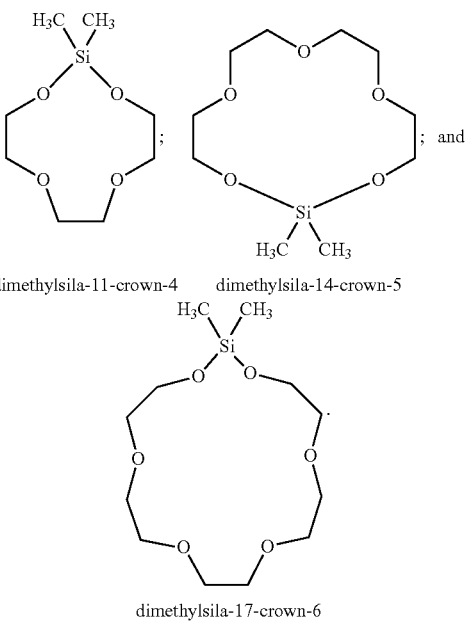

dimethylsila-11-crown-4    dimethylsila-14-crown-5 dimethylsila-17-crown-6

See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices for use herein as the first accelerator component.

For instance, poly(ethylene glycol) di(meth)acrylates suitable for use herein include those within the following structure:

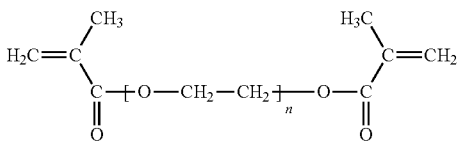

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the following structure:

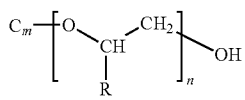

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

When used, the accelerator embraced by the above structures should be included in the compositions in an amount within the range of from about 0.01% to about 10% by weight, with the range of about 0.1 to about 0.5% by weight being desirable, and about 0.4% by weight of the total composition being particularly desirable.

A stabilizer package is also ordinarily found in cyanoacrylate compositions. The stabilizer package may include one or more free radical stabilizers and anionic stabilizers, each of the identity and amount of which are well known to those of ordinary skill in the art. See e.g. U.S. Pat. Nos. 5,530,037 and 6,607,632, the disclosures of each of which are hereby incorporated herein by reference.

Other additives may be included in the inventive cyanoacrylate compositions to confer additional physical properties, such as improved shock resistance, thickness (for instance, polymethyl methacrylate ("PMMA")), thixotropy (for instance fumed silica), silicia (for coefficient of thermal expansion ("CTE") matching), color, and enhanced resistance to thermal degradation [for instance, maleimide compounds such as N,N'-meta-phenylene bismaleimide (see U.S. Pat. No. 3,988,299 (Malofsky)), certain mono, poly or hetero aromatic compounds characterized by at least three substitutions on an aromatic ring thereof, two or more of which being electron withdrawing groups (U.S. Pat. No. 5,288,794 (Attarwala)), certain quinoid compounds (U.S. Pat. No. 5,306,752 (Attarwala)), certain sulfur-containing compounds, such as an anhydrosulfite, a sulfoxide, a sulfite, a sulfonate, a methanesulfonate or a p-toluenesulfonate (U.S. Pat. No. 5,328,944 (Attarwala)), or certain sulfur-containing compounds, such as a sulfinate, a cyclic sultinate naphthosultone compound substituted with at least one strong electron withdrawing group at least as strongly electron withdrawing as nitro (U.S. Pat. No. 5,424,343 (Attarwala)), and alkylating agents such as polyvinyl benzyl chloride, 4-nitrobenzyl chloride, and combinations thereof, silylating agents, and combinations thereof (U.S. Pat. No. 6,093,780 (Attarwala)), the disclosures of each of which are hereby incorporated herein by reference]. Such additives therefore may be selected from certain acidic materials (like citric acid), thixotropy or gelling agents, thickeners, dyes, thermal degradation resistance enhancers, and combinations thereof. See e.g. U.S. Patent Application Publication No. 2006/0094833 and U.S. Pat. Nos. 5,306,752, 5,424,344 and 6,835,789, the disclosures of each of which are hereby incorporated herein by reference.

These other additives may be used in the inventive compositions individually in an amount from about 0.05% to about 20%, such as about 1% to 15%, desirably 5% to 10% by weight, depending of course on the identity of the additive.

The inventive compositions may also be prepared in a two part format, in which the cyanoacrylate component is present in one chamber of a dual chamber cartridge and the compound embraced by structure A is present in a second chamber. The contents of the first and second chambers may be expressed and mixed through a mixing nozzle. The so-mixture composition may then be applied to the desired substrate(s) prior to mating.

In addition, the inventive composition may be _____ and applied in a two step manner. That is, the compound embraced by structure A may be first applied onto a substrate surface followed by application of a cyanoacrylate composition. The compound embraced by structure A may be dissolved or dispersed in a liquid, which may evaporate or be otherwise removed from the substrate surface prior to application of the cyanoacrylate composition. To the extent the liquid used to dissolve or disperse the compound embraced by structure A has a higher boiling point and may be itself reactive, a residue of the liquid may desirably remain on the surface of the substrate.

In another aspect of the invention, there is provided a method of preparing the so-described compositions. The method includes providing a cyanoacrylate component, and combining therewith with mixing a compound embraced by structure A.

In another aspect of the invention, there is provided a method of bonding together two substrates, which method includes applying to at least one of the substrates a composition as described above, and thereafter mating together the substrates for a time sufficient to permit the adhesive to fixture. For many applications, the substrate should become fixed by the inventive compositions in less than about 150 seconds, and depending on the substrate as little as about 30 seconds. In addition, the inventive composition should develop shear strength on the substrates between which they have been applied, as well as side impact strength and fracture toughness.

These aspects of the invention will be further illustrated by the examples which follow.

EXAMPLES

Example 1

Four samples were evaluated for their tensile shear strength on a variety of substrates.

Sample Nos. 1-4 were prepared by mixing together the noted constituents for a sufficient period of time to ensure substantial homogeneity of the constituents. Ordinarily, about 30 minutes should suffice, depending of course on the quantity of the constituents used.

TABLE 1

| Constituents | | Sample No./Amt. (wt. %) | | | |
|---|---|---|---|---|---|
| Type | Identity | 1 | 2 | 3 | 4 |
| CA | Ethyl-2-CA | 91.75 | 91.75 | 98.63 | 98.63 |
| Compound A | ClC[1] | — | 0.5 | — | 0.0003 |
| Accelerator | Crown Ether | 0.25 | 0.25 | 0.003 | 0.003 |
| Stabilizer | $BF_3$ | 2 | 2 | 0.01 | 0.01 |
| Thickener | PMMA | 6 | 6 | — | — |

[1]Tris-(2-carboxyethyl) isocyanurate

Each sample was applied to the substrates listed below in Table 2 and tensile shear strength was measured.

By way of the background, the tensile shear strength was measured using 1"×4"×⅛" metal or plastic substrates, with a 0.5 square inch overlap of the substrates, and the sample between the substrate overlap. The sample was allowed to cure at room temperature for 24 hours, after which time the resulting bond strength was measured using an Instron instrument, and is recorded below in Table 2.

TABLE 2

| Tensile Shear Strength | Sample No. | | | |
|---|---|---|---|---|
| (psi)/Substrate | 1 | 2 | 3 | 4 |
| Mild Steel | 10.74 | 18.03 | 8.52 | 14.41 |
| Aluminum | 10.37 | 15.99 | 10.46 | 14.16 |
| PVC | 13.27 | 8.84 | — | — |
| PC | 2.81 | 2.57 | — | — |
| ABS | 9.57 | 9.96 | — | — |

In addition, the tensile shear strength of Sample Nos. 3 and 4 was evaluated on mild steel and aluminum substrates after curing for 24 hours at a temperature of 60° C., as above. The results are recorded below in Table 3.

TABLE 3

| Tensile Shear Strength | Sample No. | |
|---|---|---|
| (psi)/Substrate | 3 | 4 |
| Mild Steel | 9.7 | 22.64 |
| Aluminum | 14.93 | 18.71 |

From the results set forth in Tables 2 and 3, it may be seen that cyanoacrylate compositions of the present invention show improved tensile shear strength on metal substrates and comparable tensile strength on plastic substrates, apart from PVC. In addition, curing at a temperature of 60° C. seems to dramatically improve the measured tensile shear strength of unthickened cyanoacrylate compositions, particularly where the substrates are constructed from mild steel.

What is claimed is:

1. A cyanoacrylate composition comprising:
   (a) a cyanoacrylate component; and
   (b) a compound embraced within structure A:

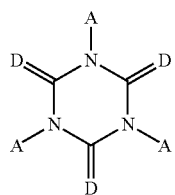

wherein D is independently a member selected from the group consisting of O and S, and A is independently a member selected from the group consisting of hydrogen, linear, branched or cyclic alkyl groups having from 1 to about 20 carbon atoms, alkenyl groups having from 2 to about 20 carbon atoms, alkynyl groups having from 2 to about 20 carbon atoms, and aryl groups having from 6 to about 20 carbon atoms, with or without interruption or substitution by a member selected from the group consisting of halogen, silicon, hydroxy, ester, and sulfate, provided that at least one A is not H and that at least one A has at least one carboxyl group attached thereto.

2. The composition of claim 1, further comprising an accelerator.

3. The composition of claim 2, wherein the accelerator is a member selected from the group consisting of calixarenes and oxacalixarenes, silacrowns, crown ethers, cyclodextrins, poly(ethyleneglycol) di(meth)acrylates, ethoxylated hydric compounds and combinations thereof.

4. The composition of claim 1, further comprising a thickener.

5. The composition of claim 1, further comprising a thixotrope.

6. The composition of claim 1, wherein in the compound D is O and A is ethylene carboxylic acid.

7. The composition of claim 1, wherein the compound is present in an amount between about 0.01 and about 10 percent by weight.

8. The composition of claim 1, further comprising a filler.

9. The composition of claim 1, further comprising a stabilizing amount of an acidic stabilizer and a free radical inhibitor.

10. The composition of claim 1, wherein the cyanoacrylate component is selected from materials within the structure H₂C=C(CN)—COOR, wherein R is selected from $C_{1-15}$ alkyl, alkoxyalkyl, cycloalkyl, alkenyl, aralkyl, aryl, allyl and haloalkyl groups.

11. The composition of claim 1, wherein the cyanoacrylate component comprises ethyl-2-cyanoacrylate.

12. Reaction products of the composition according to claim 1.

13. A method of bonding together two substrates, comprising the steps of:
   applying a cyanoacrylate composition of claim 1, to at least one of the substrates and
   mating together the substrates for a time sufficient to permit the composition to fixture.

14. A method of preparing a cyanoacrylate composition of claim 1, comprising the steps of:
   providing a cyanoacrylate component, and combining therewith with mixing a compound embraced by structure A:

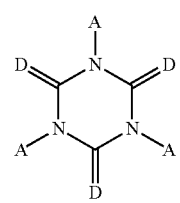

wherein D is independently a member selected from the group consisting of O and S, and A is independently a member selected from the group consisting of hydrogen, linear, branched or cyclic alkyl groups having from 1 to about 20 carbon atoms, alkenyl groups having from 2 to about 20 carbon atoms, alkynyl groups having from 2 to about 20 carbon atoms, and aryl groups having from 6 to about 20 carbon atoms, with or without interruption or substitution by a member selected from the group consisting of halogen, silicon, hydroxy, ester, and sulfate, provided that at least one A is not H and that at least one A has at least one carboxyl group attached thereto.

* * * * *